(12) United States Patent
Niemeyer et al.

(10) Patent No.: US 7,729,861 B2
(45) Date of Patent: Jun. 1, 2010

(54) METHOD AND APPARATUS FOR FORMATION TESTING

(75) Inventors: Eick Niemeyer, Niedersachsen (DE); Tobias Kischkat, Niedersachsen (DE); Matthias Meister, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/776,647

(22) Filed: Jul. 12, 2007

(65) Prior Publication Data

US 2008/0015781 A1 Jan. 17, 2008

Related U.S. Application Data

(60) Provisional application No. 60/830,266, filed on Jul. 12, 2006.

(51) Int. Cl.
*G01V 9/00* (2006.01)
*G01B 5/28* (2006.01)

(52) U.S. Cl. ............. 702/11; 73/152.24; 166/250.07; 702/156

(58) Field of Classification Search ............. 702/11–14, 702/104, 156; 73/152.24, 152.26, 152.55; 166/250.07, 250.5, 264; 175/50
See application file for complete search history.

(56) References Cited

U.S. PATENT DOCUMENTS

| 4,860,581 | A | 8/1989 | Zimmerman et al. |
| 6,478,096 | B1 | 11/2002 | Jones et al. |
| 6,581,455 | B1 | 6/2003 | Berger et al. |
| 6,585,045 | B2 | 7/2003 | Lee et al. |
| 6,609,568 | B2 | 8/2003 | Krueger et al. |
| 6,640,908 | B2 | 11/2003 | Jones et al. |
| 7,140,436 | B2 | 11/2006 | Grant et al. |
| 7,260,985 | B2 * | 8/2007 | Gilbert et al. ............ 73/152.24 |
| 2004/0045706 | A1 * | 3/2004 | Pop et al. ............... 166/250.07 |

* cited by examiner

*Primary Examiner*—John H Le
(74) *Attorney, Agent, or Firm*—Cantor Colburn LLP

(57) ABSTRACT

A method for conducting a formation test includes providing a volume change model for a tool component, and providing a control program that uses the volume change model to estimate a system volume change resulting from a change in the tool component during a downhole operation. An apparatus for conducting a formation test includes a carrier, a formation test tool, a measurement device that estimates a change in a tool component during operation, and a processor that uses a volume change model to estimate a system volume change resulting at least in part from the change in the tool component during a downhole operation.

25 Claims, 9 Drawing Sheets

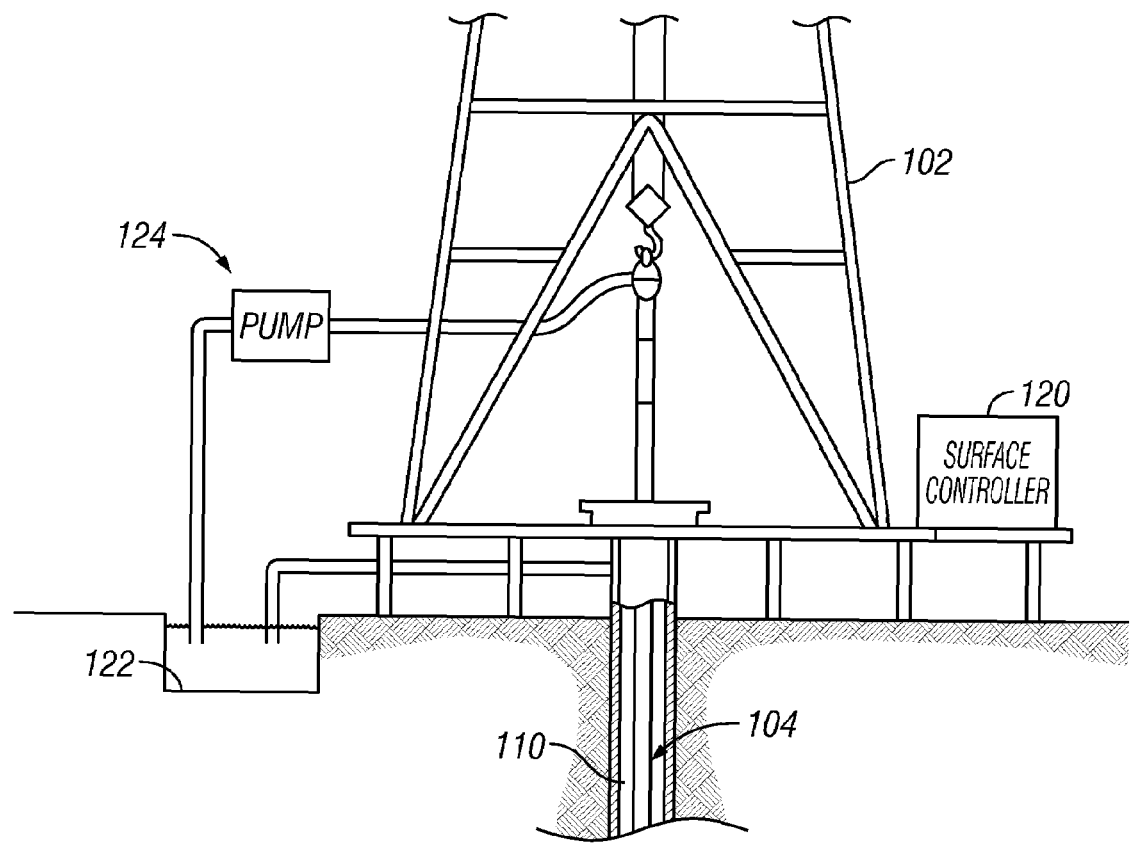
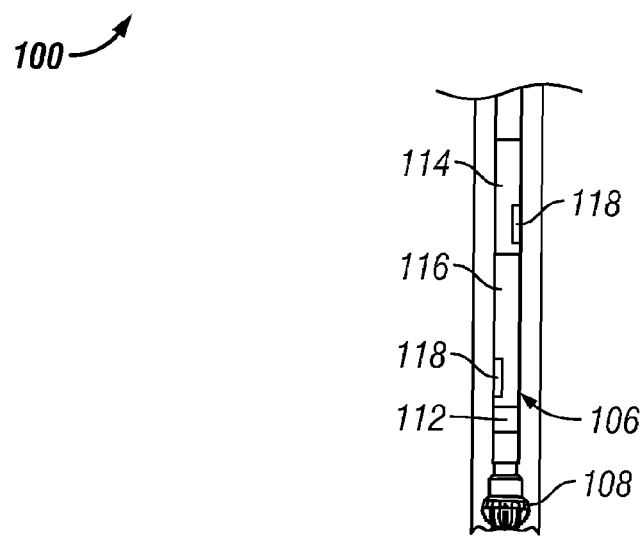
FIG. 1

METHOD AND APPARATUS FOR FORMATION TESTING

CROSS-REFERENCE TO RELATED APPLICATIONS

The present application is related to U.S. provisional application Ser. No. 60/830,266 for "METHOD AND APPARATUS FOR FORMATION TESTING," filed on Jul. 12, 2006, the entire contents of which is hereby incorporated herein by reference.

BACKGROUND

1. Technical Field

The present disclosure generally relates to apparatuses and methods for evaluating formations traversed by a well borehole.

2. Background Information

In the oil and gas industry, formation testing tools have been used for monitoring formation pressures along a well borehole, obtaining formation fluid samples from the borehole, and for predicting performance of reservoirs around the borehole. Such formation testing tools typically contain an elongated body having an elastomeric packer and/or pad that is sealingly urged against a zone of interest in the borehole to collect formation fluid samples in fluid receiving chambers placed in the tool.

Downhole multi-tester instruments have been developed with extensible sampling probes for engaging the borehole wall at the formation of interest for withdrawing fluid samples from the formation and for measuring pressure. In downhole instruments of this nature an internal pump or piston may be used after engaging the borehole wall to reduce pressure at the instrument formation interface causing fluid to flow from the formation into the instrument.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for conducting a formation test that includes providing a volume change model for a tool component, and providing a control program that uses the volume change model to estimate a system volume change resulting from a change in the tool component during a downhole operation.

Another aspect provides an apparatus for conducting a formation test that includes a carrier conveyable into a well borehole, a formation test tool coupled to the carrier, the formation test tool including a tool component, a measurement device that estimates a change in the tool component during operation, and a processor that uses a volume change model to estimate a system volume change resulting at least in part from the change in the tool component during a downhole operation.

Yet another aspect of the disclosure provides a method for conducting a formation test that includes conveying a tool component into a well borehole, contacting a subterranean formation with a the tool component to establish fluidic communication with the subterranean formation, conducting a formation test operation, and estimating a volume change using a volume change model that relates a tool component change to a volume change.

BRIEF DESCRIPTION OF THE DRAWINGS

For detailed understanding of the present disclosure, references should be made to the following detailed description of the several embodiments, taken in conjunction with the accompanying drawings, in which like elements have been given like numerals and wherein:

FIG. 1 illustrates a non-limiting example of a well drilling apparatus;

DESCRIPTION OF EXEMPLARY EMBODIMENTS

Figure 2:
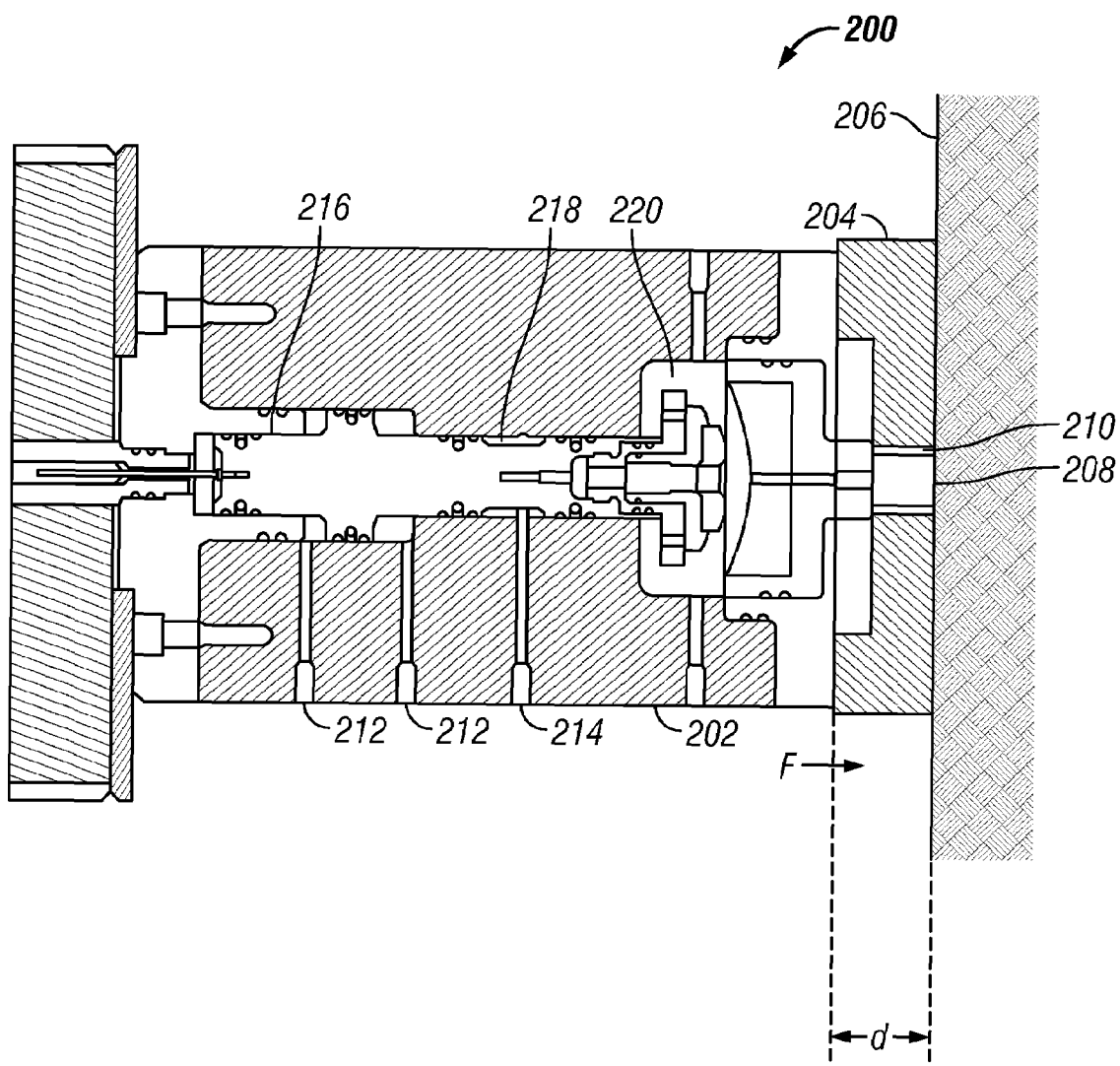
FIG. 2 illustrates a non-limiting example of an extendable probe.

FIG. 1 schematically illustrates a non-limiting example of a drilling system 100 in a measurement-while-drilling (MWD) arrangement according to one embodiment of the disclosure. A derrick 102 supports a drill string 104, which may be a coiled tube or drill pipe. The drill string 104 may carry a bottom hole assembly (BHA) 106 and a drill bit 108 at a distal end of the drill string 104 for drilling a borehole 110 through earth formations.

Drilling operations according to several embodiments may include pumping drilling fluid or "mud" from a mud pit 122, and using a circulation system 124, circulating the mud through an inner bore of the drill string 104. The mud exits the drill string 104 at the drill bit 108 and returns to the surface through an annular space between the drill string 104 and inner wall of the borehole 110. The drilling fluid is designed to provide the hydrostatic pressure that is greater than the formation pressure to avoid blowouts. The pressurized drilling fluid may further be used to drive a drilling motor and may provide lubrication to various elements of the drill string.

In one non-limiting embodiment, subs 114 and 116 may be positioned as desired along the drill string 104. As shown, a sub 116 may be included as part of the BHA 106. Each sub 114, 116 may include one or more components 118 adapted to provide formation tests while drilling ("FTWD") and/or functions relating to drilling parameters. The sub 114 may be used to obtain parameters of interest relating to the formation, the formation fluid, the drilling fluid, the drilling operations or any desired combination. Characteristics measured to obtain to the desired parameter of interest may include pressure, flow rate, resistivity, dielectric, temperature, optical properties, tool azimuth, tool inclination, drill bit rotation, weight on bit, etc. These characteristics may be processed by a processor (not shown) downhole to determine the desired parameter. Signals indicative of the parameter may then be transmitted to the surface via a transmitter 112. The transmitter 112 may be located in the BHA 106 or at another location on the drill string 104. These signals may also, or in the alternative, be stored downhole in a data storage device and may also be processed and used downhole for geosteering or for any other suitable downhole purpose. In one example, wired pipe may be used for transmitting information.

One non-limiting example of a sub 116 component 118 may include a fluid sampling probe having a seal that is mechanically pressed against the formation adjacent the borehole. In one example the seal may be a durable rubber pad, the pad being pressed hard enough to form a hydraulic seal. The pad has an opening or port, which may be supported by an inner tube. The tube may be metal, ceramic or any other useful material for a supporting inner tube. The port and a conduit within the probe provide fluid communication between the formation and a sample chamber that, in turn, may be connected to a pump or piston that operates to lower the pressure at the attached probe. When the pressure in the probe is lowered below the pressure of the formation fluids, the formation fluids are drawn through the probe into the instrument.

FIG. 2 illustrates a non-limiting example of an extendable probe 200, which may be utilized as a sub component in a downhole tool such as the apparatus described above and shown in FIG. 1. The probe 200 may be incorporated into a BHA 106 as a sub component 118. Continuing with FIG. 2 a probe body 202 has an inner cavity 220 housing a piston 216. The piston 216 may include a structure that forms an annular region 218 in fluid communication with a draw down port 214 in the body 202. Control ports 212 are used to convey hydraulic pressure for reciprocating the piston 216 within the cavity.

The probe 200 may be hydraulically extendable for engaging a borehole wall 206 or the entire tool may be urged against the wall 206 using not-shown pistons located on a tool side opposed to the pad side of the tool.

A pad 204 operates as a seal member between the probe 200 and the borehole wall 206. The pad 204 includes a port 208 to allow formation fluid to enter the probe 200. An insert 210 may be used to maintain an inner diameter of the port 208 as the pad 204 is forced against the borehole wall 206. Hydraulic control for applying pad force F for sealing the tool against the borehole wall may be isolated from the hydraulic control lines used for fluid sampling and movement of the piston 216. In this manner, the probe may be moved without affecting the sample volume within the tool. A test volume within the tool is relatively small and during a pressure test or other sensitive tests in which a volume change might affect the tests, a deformation of the pad 204 may change the internal volume enough to affect test results. In some examples, other extension probe configurations may be used where either pad movement or piston extension movement may affect internal system volume. Determining and/or estimating how the pad is affected by the sealing force helps to characterize the effect of pad deformation which might occur during such tests. Likewise, determining and/or estimating piston movement helps to characterize the effect of piston movement during testing.

Figure 3:
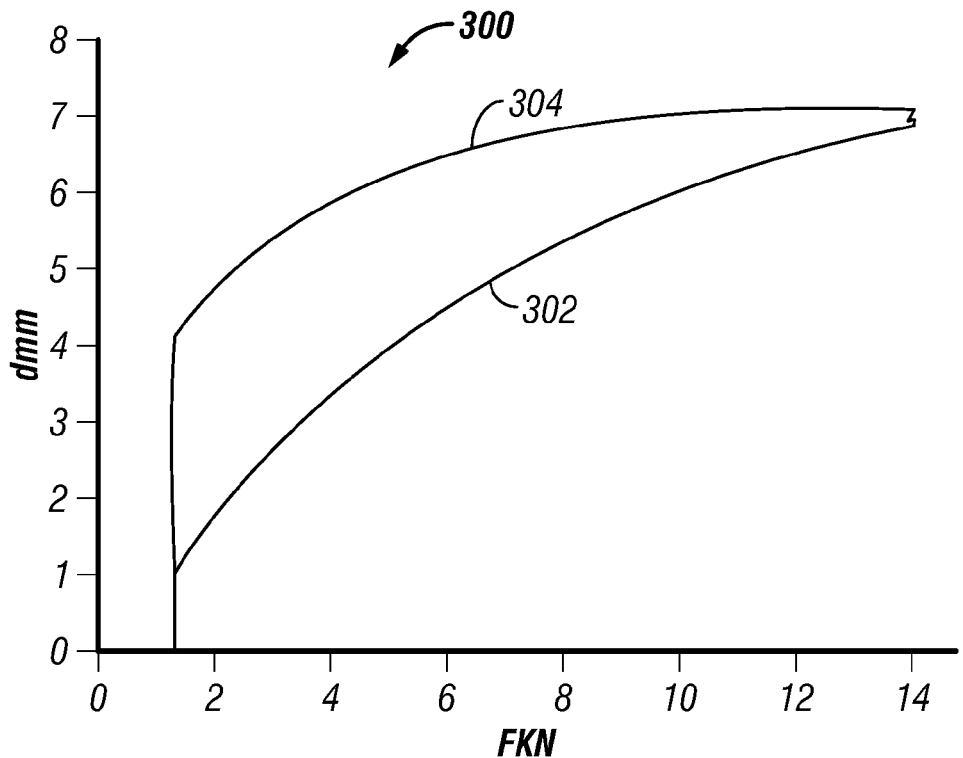
FIG. 3 illustrates a pad model.
Figure 4:
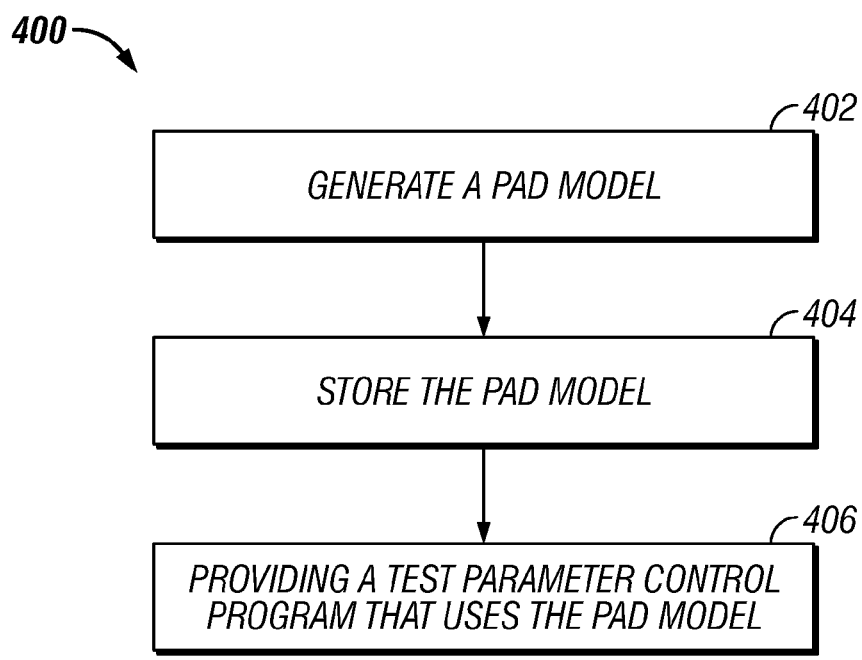
FIG. 4 illustrates a non-limiting example of a method for generating a pad model.

FIG. 4 illustrates a method 400 of characterizing a formation test tool to form a pad model. Referring to FIG. 3 and FIG. 4, a tool seal member is modeled by testing or analysis during manufacturing to determine material characteristics given selected tool parameters and expected downhole operating conditions such as temperature. In the non-limiting example of FIG. 3, pad material deformation "d" may be graphed with respect to force "F" shown in kilo-Newtons kN, which is applied to the pad material as shown in the graph 300. The graph 300 simulates the effect on the pad of the force used to seal the pad against the borehole wall. As shown, one might expect that a hysteresis effect may cause a first curve 302 to be associated with an increasing applied force and a second curve 304 associated with a decreasing applied force. The deformation is shown in millimeters (mm) and may be estimated downhole by any suitable measuring device.

Continuing with FIG. 4, the method includes storing the pad model 402 and providing a test parameter control program 404 that uses the pad model. In one embodiment, the pad model may be used to correct a system volume calculation. In another embodiment, the pad model may be used to as part of active control for the test tool. In yet another embodiment, the pad model may be used for a combination of tool control and correcting system volume calculations.

In one non-limiting example, an embodiment includes testing a pad at several temperatures and applying a varying force to the pad at each of the several temperatures to generate a pad model for several temperatures, which may be the case for several depths in a well borehole. In another non-limiting example, the pad model may be generated to include one or more ambient pressures in addition to the varying force. In one aspect, the pad model is stored on a memory device to be disposed on the tool for downhole use of the model. In another non-limiting aspect the model may be stored on a computer-readable medium and used uphole, as in the case, for example, of a wireline tool.

As mentioned, the method may further include providing a test parameter control program that uses the pad model. In one non-limiting example a test parameter control program may be a set of instructions stored in a memory device and disposed on the tool for downhole control of the tool. In another non-limiting aspect, the test parameter control program may be a set of instructions stored on a computer-readable medium and used uphole, as in the case, for example, of a wireline tool. The control program may be used during operation to control the formation test tool when the pad used to seal against the borehole wall is deformed due to pad squeeze. The program may be used to correct for a sample volume change caused by the pad squeeze. Likewise, a change in the borehole wall that reduces pad squeeze may be detected using the measurement device such as a pressure sensor or extension displacement sensor. In one non-limiting example, probe extension may be measured to estimate pad deformation also referred to as pad squeeze. Then the change in volume may be controlled during a pressure test to help ensure a constant system volume is maintained, or to gather information for correlating the volume change to the test data results or a combination of both.

Figure 5:
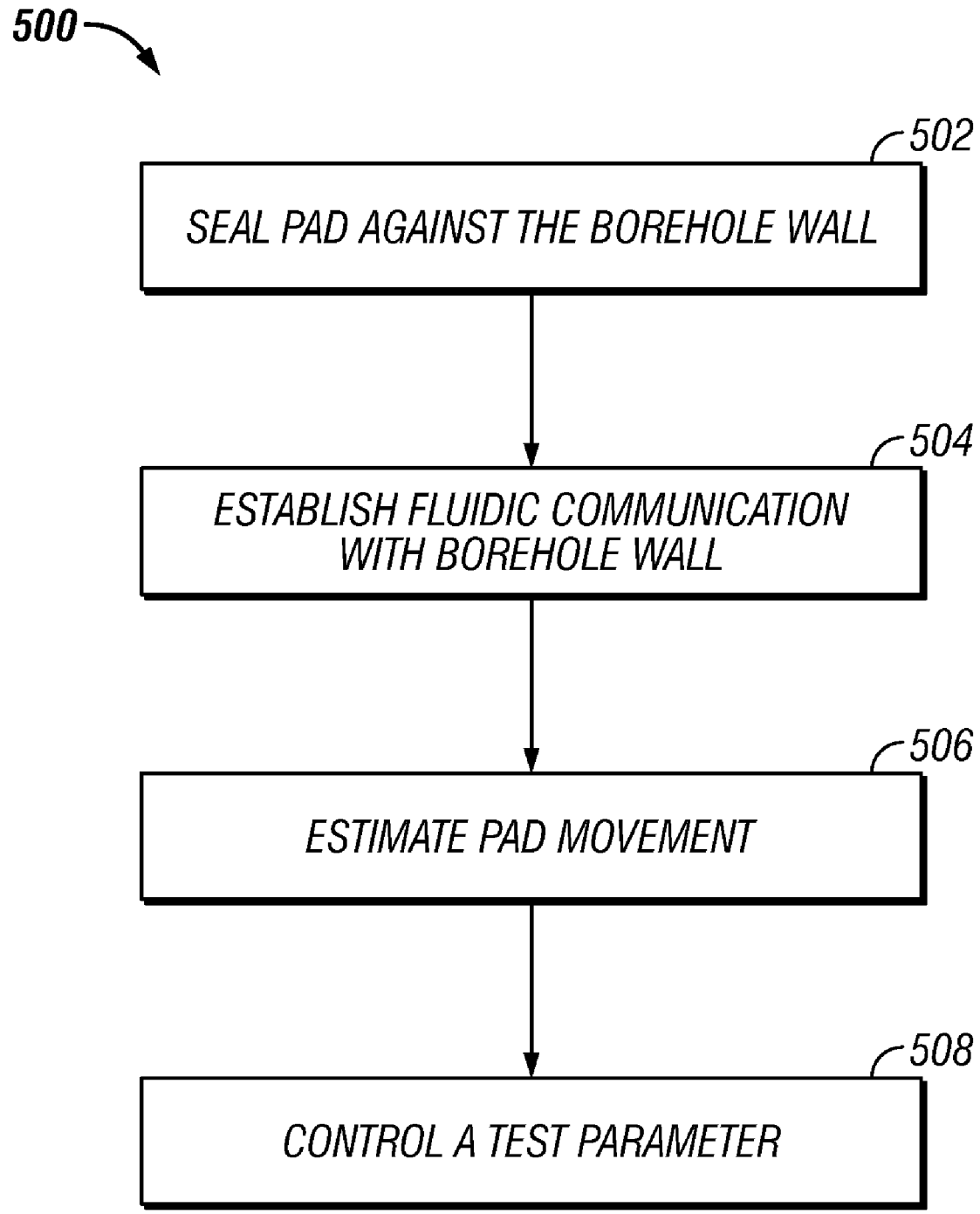
FIG. 5 illustrates a non-limiting example of a method for evaluating a subterranean formation.

FIG. 5 illustrates a method 500 for testing a subterranean formation. A seal member or pad is sealed against a borehole wall 502 and fluidic communication is established with the borehole wall 504. During a formation evaluation test, such as a In one non-limiting example, the pad movement due to squeeze and relaxation is estimated using a pad model such as the pad model described above and shown in FIG. 3. In one non-limiting embodiment, the test parameter controlled may include draw piston movement. In another non-limiting example, the test parameter controlled may include pad pressure.

Figure 6:
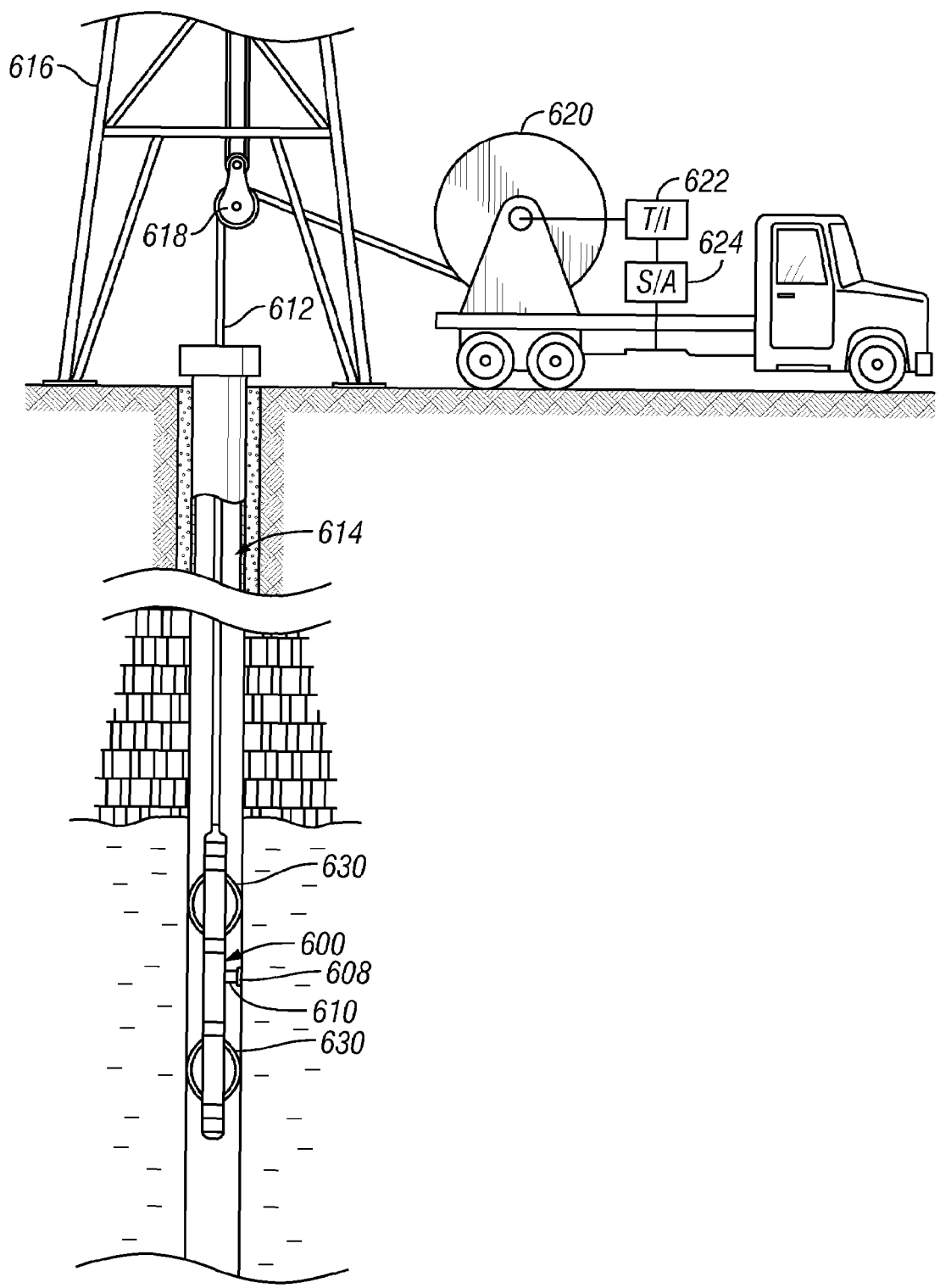
FIG. 6 illustrates a non-limiting example of a wireline apparatus FIG. 7 schematically illustrates another non-limiting example of an extendable probe.

The present disclosure is not limited to while-drilling embodiments. In FIG. 6 for example, a measuring tool 600 is shown disposed in a borehole 614 and supported by a wireline cable 612. The tool 600 may be centralized in the borehole 614 centralizers 630. The cable 612 may be supported by a sheave wheel 618 disposed in a drilling rig 616 and may be wound on a drum 620 for lowering or raising the tool 600 in the borehole. The cable 612 may comprise a multi-strand cable having electrical conductors for carrying electrical signals and power from the surface to the tool 600 and for transmitting data measured by the tool to the surface for processing. The cable 612 may be interconnected to a telemetry interface circuit 622 and to a surface acquisition unit 624.

In the non-limiting example of FIG. 6, the wireline tool 600 may include an extendable probe 610 having an elastomer seal member or pad 608 at a distal end of the extendable probe. Such a probe may be similar to the probe 200 described above and shown in FIG. 2. In one non-limiting aspect, the pad 608 may be modeled as described above and shown in FIGS. 3 and 4. In another non-limiting aspect, the tool 600 may be used to evaluate a subterranean formation in similar fashion as described above and shown in FIG. 5.

Figure 7:
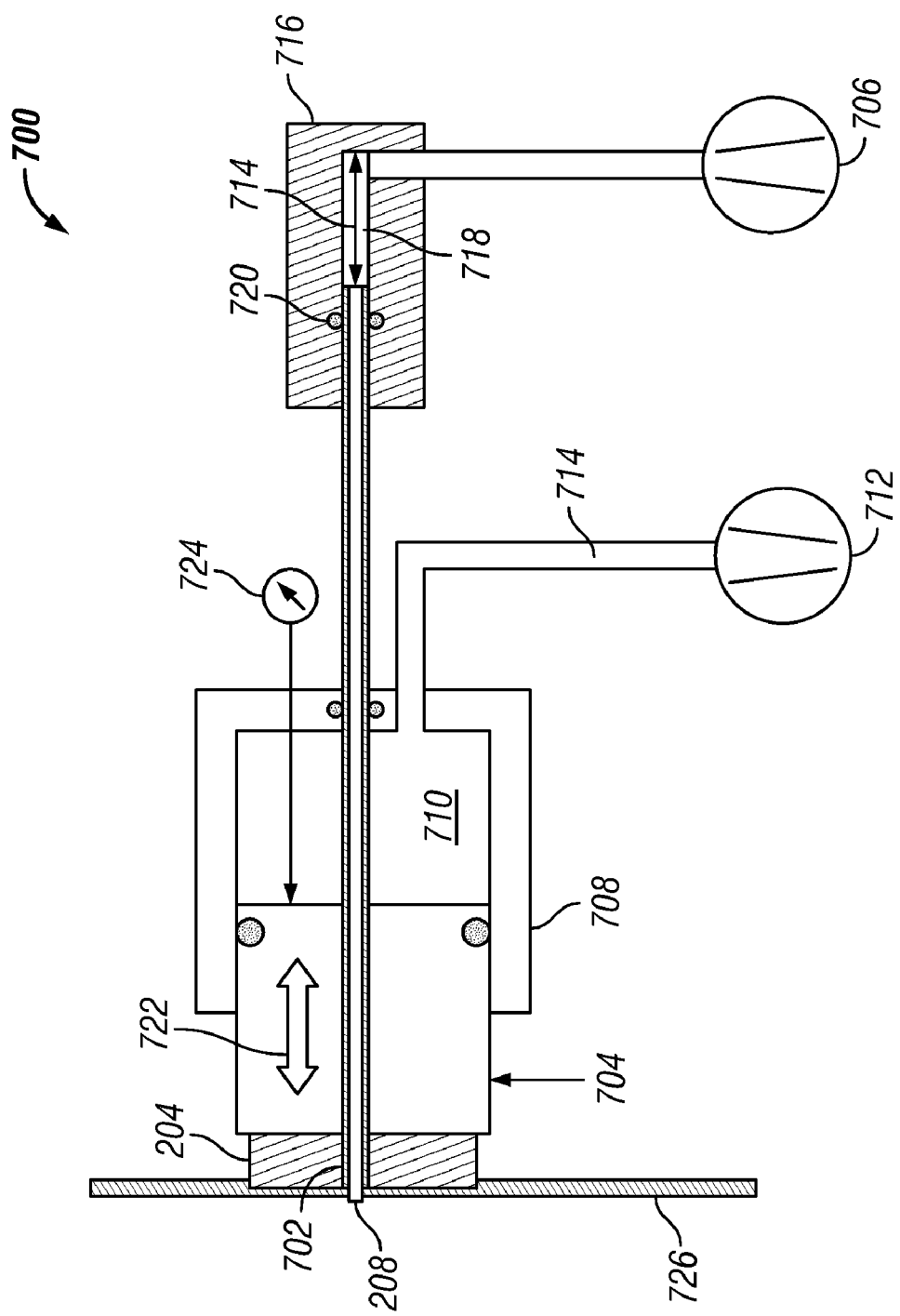

FIG. 7 schematically illustrates another non-limiting example of an extendable probe 700 that may be used in several embodiments of the disclosure and is useful in downhole fluid sampling and formation testing operations. In the example of FIG. 7, the extendable probe 700 is shown in an extended position. A pad 204 similar to the pad 204 described above and shown in FIG. 2 is disposed on an end of a piston 704. The pad 204 is pressed against the borehole wall 726 by the piston 704. A port 208 in the pad 204 provides fluid communication between the probe 700 and the formation being tested. A formation fluid conduit 702 extends axially through the piston 704. The formation fluid conduit 702 extends from the port 208 through the piston 704. A draw down pump 706 is in communication with the formation fluid conduit 702, and the draw down pump 706 may be used to reduce pressure at the port 208 to urge formation fluid from the formation into the formation fluid conduit 702.

In the example of FIG. 7, the piston 704 is housed within a housing 708 having an internal cavity 710. The piston 704 moves within the cavity 710 by the use of a piston extension pump 712 that is in fluid communication with the cavity 710. Other piston extension devices, such as mechanical devices, electrical and/or electromechanical devices may be used and are considered within the scope of the disclosure. Hydraulic fluid 714 is pumped into the cavity 710 by the extension pump 712, and hydraulic pressure in the cavity 710 operates on the piston 704 to retract or extend the piston 704 as shown.

Movement of the piston 704 in several probe arrangements may cause a consequent volume change in the formation fluid path as indicated by the arrow 714. This portion of the formation fluid path may be part of the system volume $V_{SYS}$ that is used for several test operations. In the example shown, the formation fluid conduit 702 is in communication with a tool housing portion 716. The tool housing portion 716 includes an internal cavity 718 in which the formation fluid conduit 702 reciprocates. Seals 720 may be used to prevent leakage of pressurized formation fluid via the annular space between the tool housing portion 716 and the formation fluid conduit 702.

Movement of the piston 704, as indicated by arrow 722, may be detected using any number of techniques. In several non-limiting embodiments, the piston movement is estimated using a suitable sensor 724. The sensor 724 may be one or more of a pressure sensor, a force sensor, a displacement sensor or any other sensor useful for estimating movement of the piston 704.

The estimated piston movement may be used along with known system volume parameters to estimate a change in $V_{SYS}$ due to piston movement. In one embodiment, a cross-section area of the formation fluid conduit 702 may be used with the estimated piston movement to estimate a volume change such as that indicated at 714. Of course, other piston configurations may include an internal volume that is affected by the piston movement and which may not include a change in the formation fluid conduit 702 as shown here. Those skilled in the art with the benefit of the present disclosure will recognize that any internal volume affected by piston movement is within the scope of the disclosure.

Figure 8:
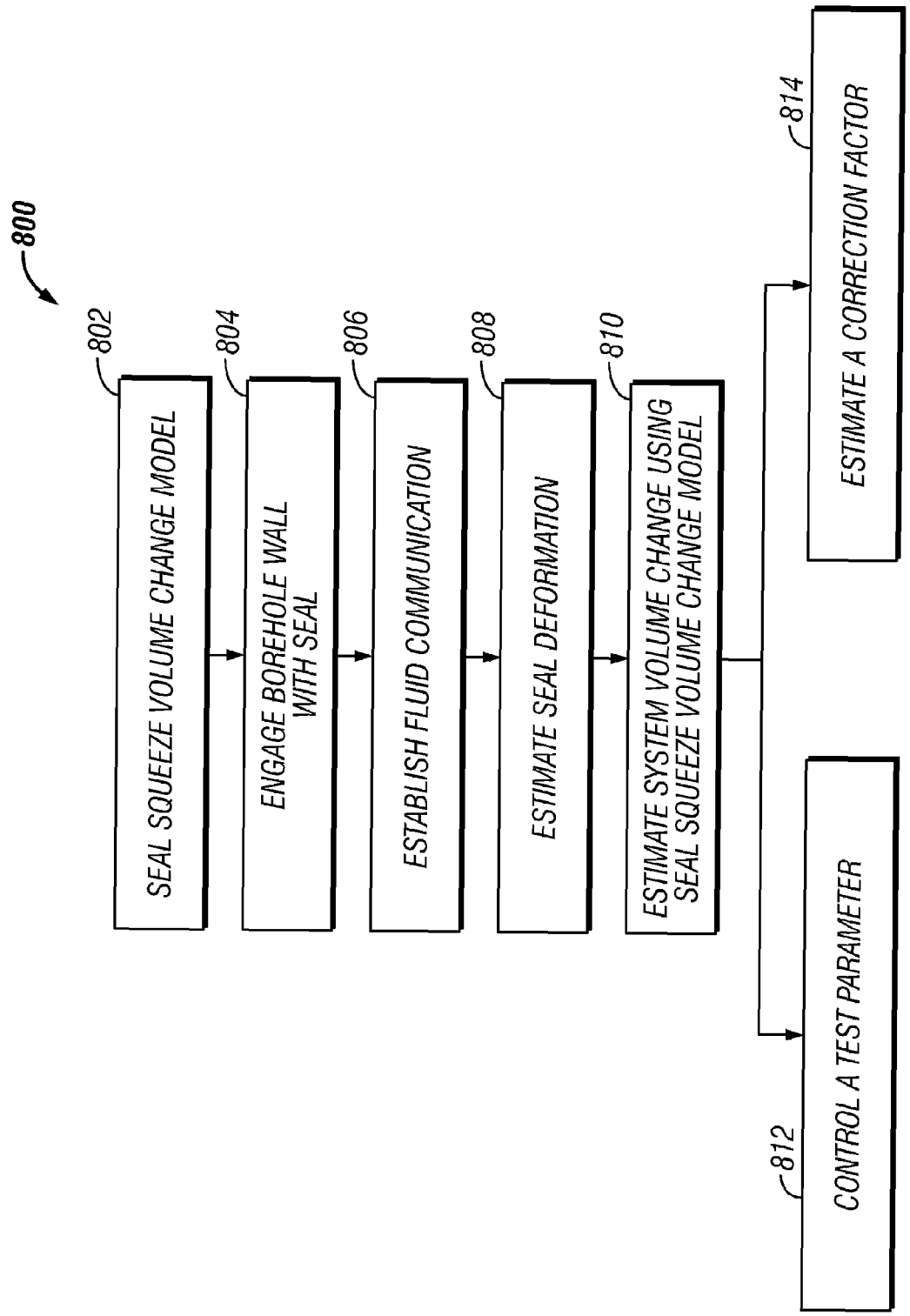
FIG. 8 is a non-limiting example of a method where a seal squeeze volume change model is used to estimate a system volume change.

FIG. 8 is a non-limiting example of a method where a seal squeeze volume change model 802 is used to estimate a system volume change. The method 800 includes sealing a pad against a borehole wall 804 and establishing fluid communication with the borehole wall 806. The method 800 includes estimating pad squeeze based at least in part on pad pressure 808. A system volume change may be estimated 810 based in part on the estimated pad squeeze. In one example the estimated volume change may be used to control a test parameter 812. In one example the estimated volume change may be used to calculate a correction factor for formation testing operations 814. In yet another example the estimated volume change may be used to control a test parameter 812 in addition to calculating a correction factor for formation testing operations 814. Using the method 800 allows for using volume change for correct test data results or to control the system volume to maintain a constant system volume or a combination of both.

Figure 9:
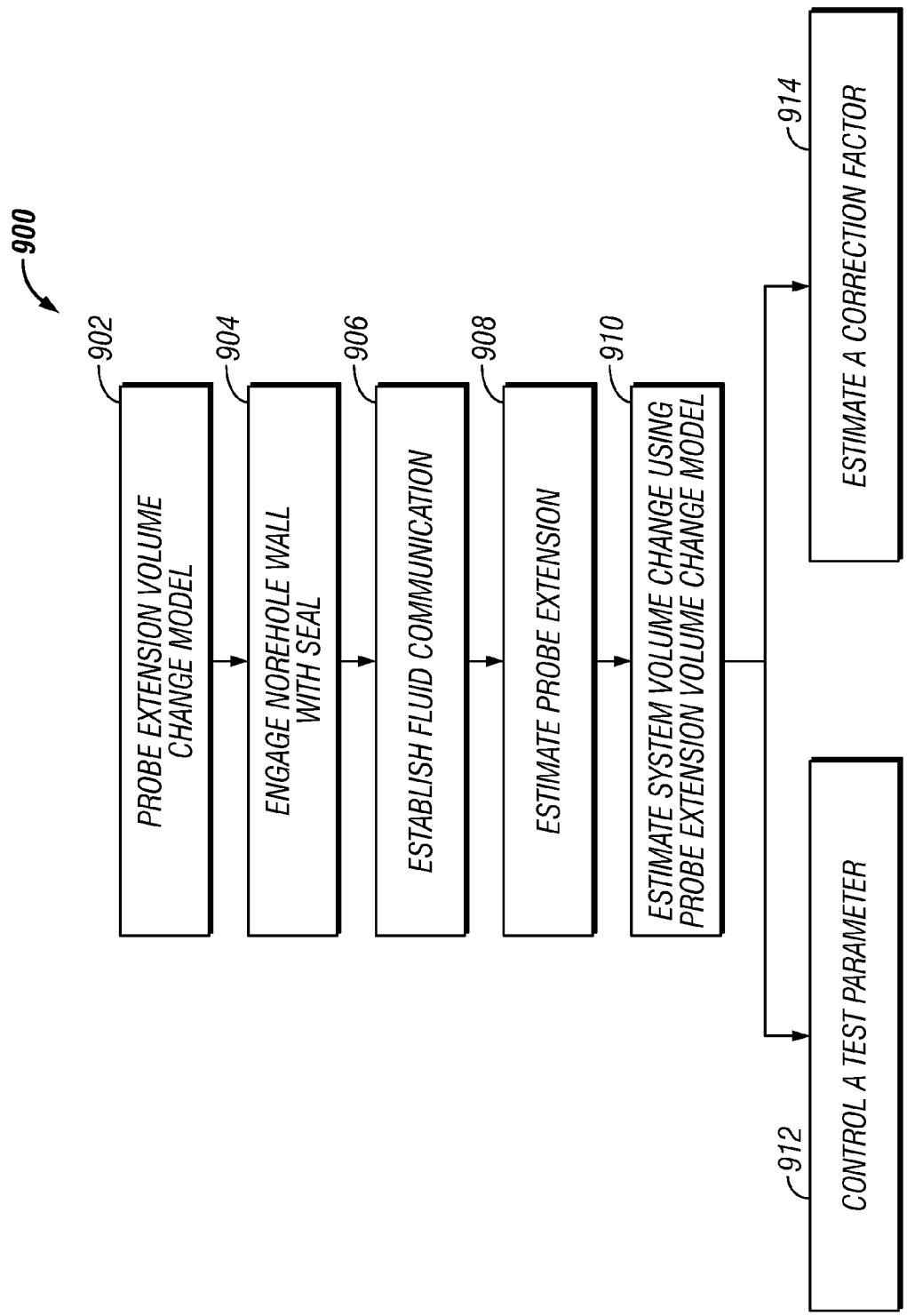
FIG. 9 is a non-limiting example of a method where a probe extension volume change model is used to estimate a system volume change.

FIG. 9 is a non-limiting example of a method 900 where a probe extension volume change model 902 is used to estimate a system volume change. The method 900 includes sealing a pad against a borehole wall 904 and establishing fluid communication with the borehole wall 906. The method 900 includes estimating probe extension 908. A system volume change may be estimated 910 based in part on the estimated probe extension. In one example the estimated volume change may be used to control a test parameter 912. In one example the estimated volume change may be used to calculate a correction factor for formation testing operations 914. In yet another example the estimated volume change may be used to control a test parameter 912 in addition to calculating a correction factor for formation testing operations 914. Using the method 900 allows for using volume change for correct test data results or to control the system volume to maintain a constant system volume or a combination of both.

Figure 10:
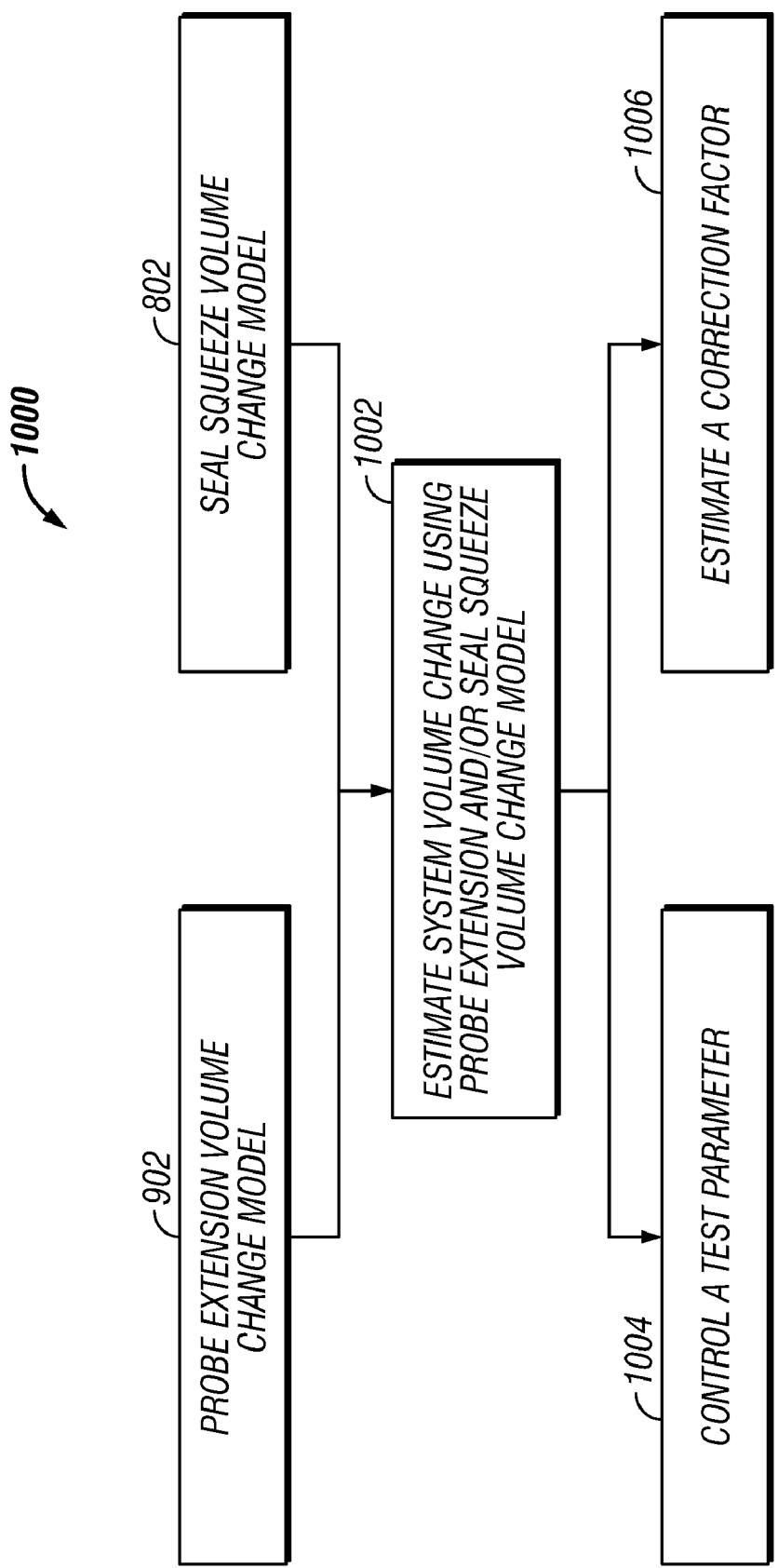
FIG. 10 is a non-limiting example of a method where a seal squeeze volume change model and a probe extension volume change model are combined to estimate a system volume change.

FIG. 10 is a non-limiting example of a method 1000 where a seal squeeze volume change model 802 and a probe extension volume change model 902 are combined to estimate a system volume change. The method 1000 includes sealing a pad against a borehole wall and establishing fluid communication with the borehole wall as discussed above for the respective method embodiments 800, 900. A system volume change may be estimated 1002 based in part using estimated probe movement and the probe extension volume change model 902 and based in part on pad deformation and the seal squeeze volume change model 802. In one example the estimated volume change may be used to control a test parameter 1004. In one example the estimated volume change may be used to calculate a correction factor for formation testing operations 1006. In yet another example the estimated volume change may be used to control a test parameter 1004 in addition to calculating a correction factor for formation testing operations 1006. Using the method 1000 allows for using volume change for correct test data results or to control the system volume to maintain a constant system volume or a combination of both.

Having described above the several aspects of the disclosure, one skilled in the art will appreciate several particular embodiments disclosed herein. By way of example and not for limiting the disclosure, several particular embodiments are provided below.

In one particular embodiment, a method for conducting a formation test includes providing a volume change model for a tool component, and providing a control program that uses the volume change model to estimate a system volume change resulting from a change in the tool component during a downhole operation.

In another embodiment, a method for conducting a formation test includes storing one or more of a volume change model and a control program on a computer-readable medium.

In another embodiment, a method for conducting a formation test includes storing one or more of a volume change model and a control program on a computer-readable medium and disposing the computer readable medium in a formation test sub. In one aspect, the formation test sub may be conveyed on one or more of a wireline formation test sub and a while-drilling formation test sub.

In another particular embodiment, a method for conducting a formation test includes providing a volume change model comprising a seal model, the seal model relating a system volume change to seal deformation.

In another particular embodiment, a method for conducting a formation test includes providing a volume change model comprising a probe model relating a system volume change to probe movement.

In another particular embodiment, a method for conducting a formation test includes providing a volume change model comprising a combination of a seal model and a probe model, the seal model and probe model relating a system volume change to respective seal deformation and probe movement.

In one particular embodiment, an apparatus for conducting a formation test includes a carrier conveyable into a well borehole, a formation test tool coupled to the carrier, the formation test tool including a tool component, a measurement device that estimates a change in the tool component during operation, and a processor that uses a volume change model to estimate a system volume change resulting at least in part from the change in the tool component during a downhole operation.

In one particular embodiment, an apparatus for conducting a formation test includes a controller that controls a test operation using an estimated system volume change.

In another particular embodiment, an apparatus for conducting a formation test includes an extendable formation fluid sampling probe, where an estimated tool component change includes an extension of the formation fluid sampling probe.

In another embodiment, an apparatus for conducting a formation test includes a tool component comprising a seal that engages a subterranean formation, where an estimated tool component change includes a deformation of the seal.

Yet another aspect of an apparatus for conducting a formation test is a formation test tool comprising an extendable formation fluid sampling probe having a seal member disposed on a distal end of the formation fluid sampling probe, where an estimated tool component change includes an extension of the formation fluid sampling probe in combination with a deformation of the seal.

In one particular embodiment, an apparatus for conducting a formation test includes a formation test tool that comprises an extendable formation fluid sampling probe having a seal disposed on a distal end of the formation fluid sampling probe and a measurement device measuring one or more of i) a distance relating to an extension of the formation fluid sampling probe, ii) a force exerted on the seal, and iii) a hydraulic pressure used to extend the formation fluid sampling probe.

In another embodiment, an apparatus for conducting a formation test includes a controller that controls one or more of a formation fluid draw pump and a probe extension pump.

In one aspect a carrier comprises at least one of a drill pipe, a wired pipe, a coil tube, and a wireline.

In one particular embodiment, a method for conducting a formation test includes conveying a tool component into a well borehole, contacting a subterranean formation with a the tool component to establish fluidic communication with the subterranean formation, conducting a formation test operation, and estimating a volume change using a volume change model that relates a tool component change to a volume change.

In one particular embodiment, a method for conducting a formation test includes using a seal that contacts a subterranean formation, where a volume change model comprises a seal model, the seal model relating a system volume change to seal deformation.

In another particular embodiment, a method for conducting a formation test includes using a tool component that has a probe having a seal at a distal end for contacting a subterranean formation, where a volume change model comprises a probe model relating a system volume change to probe movement.

In another particular embodiment, a method for conducting a formation test includes using a tool component that has a probe having a seal at a distal end for contacting a subterranean formation, where a volume change model comprises a combination of a seal model and a probe model, the seal model and probe model relating a system volume change to respective seal deformation and probe movement.

In several other embodiments, a method for conducting a formation test includes estimating a correction factor for correcting formation test information, the correction factor being based at least in part on the estimated system volume change. In another aspect a method includes controlling a test parameter and estimating a correction factor for correcting formation test information, the controlling and the correction factor being based at least in part on estimated system volume change. In another embodiment a volume change model comprises an estimated response of a seal member material to a downhole parameter. In another embodiment a downhole parameter comprises one or more of i) a distance relating to an extension of the seal member ii) a force exerted on the seal member, and iii) a hydraulic pressure used to extend the seal member for contacting the subterranean formation.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and several particular embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. An apparatus for conducting a formation test comprising:
   a carrier conveyable into a well borehole;
   a formation test tool coupled to the carrier, the formation test tool including a seal that engages a borehole wall;
   a measurement device that estimates a seal parameter during operation; and
   a processor configured to use a seal model to estimate a system volume change resulting at least in part from a change in the seal during a downhole operation, wherein using the seal model includes correlating the seal parameter to the seal model to estimate the system volume change.

2. The apparatus of claim 1 further comprising a controller that controls a test operation using the estimated system volume change.

3. The apparatus of claim 2, wherein the controller controls one or more of a formation fluid draw pump and a probe extension pump.

4. The apparatus of claim 1, wherein the formation test tool comprises an extendable formation fluid sampling probe, the seal being a pad seal disposed on the formation fluid sampling probe.

5. The apparatus of claim 1, wherein the change in the seal includes a deformation of the seal.

6. The apparatus of claim 1, wherein the formation test tool comprises an extendable formation fluid sampling probe, wherein the seal is disposed on a distal end of the formation fluid sampling probe, the estimated system volume change being based in part on an extension of the formation fluid sampling probe in combination with the seal model.

7. The apparatus of claim 1, wherein the formation test tool comprises an extendable formation fluid sampling probe having the seal disposed on a distal end of the formation fluid sampling probe, the measurement device measuring one or more of i) a distance relating to an extension of the formation fluid sampling probe, ii) a force exerted on the seal, and iii) a hydraulic pressure used to extend the formation fluid sampling probe.

8. The apparatus of claim 1, wherein the carrier comprises at least one of a drill pipe, a wired pipe, a coil tube, and a wireline.

9. The apparatus of claim 1, wherein the seal parameter includes at least one of a seal movement, a seal volume, a seal volume change, a deformation and a seal shape.

10. The apparatus of claim 1, wherein the seal model includes data corresponding to measured seal parameters associated with known model parameters.

11. The apparatus of claim 10, wherein the known model parameters include at least one of force, pressure, temperature and seal material characteristics.

12. The apparatus of claim 10, wherein correlating the seal parameter includes correlating the seal parameter to at least one of the known model parameters.

13. A method for conducting a formation test comprising:
    conveying a tool in a well borehole;
    contacting a subterranean formation with a seal disposed on the tool to establish fluidic communication with the subterranean formation;
    conducting a formation test operation estimating a seal parameter during the formation test operation; and
    estimating a volume change using a seal model that relates a change in the seal to a system volume, wherein using the seal model includes correlating the seal parameter to the seal model to estimate the system volume change.

14. The method of claim 13, wherein the tool includes a probe the seal being disposed at a distal end of the probe for contacting the subterranean formation, the method further comprising relating the estimated system volume change to probe movement.

15. The method of claim 13, wherein conveying a tool into a well borehole comprises using one or more of a drill pipe, a wired pipe, a coil tube, and a wireline.

16. The method of claim 13 further comprising controlling a test parameter based at least in part on the estimated volume change.

17. The method of claim 16, wherein controlling the test parameter includes controlling one or more of a formation fluid draw pump and a probe extension pump.

18. The method of claim 13 further comprising estimating a correction factor for correcting formation test information, the correction factor being based at least in part on the estimated volume change.

19. The method of claim 13 further comprising controlling a test parameter and estimating a correction factor for correcting formation test information, the controlling and the correction factor being based at least in part on the estimated volume change.

20. The method of claim 13, wherein the seal model comprises an estimated response of a seal material to a downhole parameter.

21. The method of claim 20, wherein the downhole parameter comprises one or more of i) a distance relating to an extension of the seal ii) a force exerted on the seal, and iii) a hydraulic pressure used to extend the seal for contacting the subterranean formation.

22. The method of claim 13, wherein the seal parameter includes at least one of a seal movement, a seal volume, a seal volume change, a deformation and a seal shape.

23. The method of claim 13 further comprising generating the seal model by measuring a seal parameter at a plurality of known model parameters.

24. The method of claim 23, wherein the known model parameters include at least one of force, pressure, temperature and seal material characteristics.

25. The method of claim 23, wherein correlating the seal parameter includes correlating the seal parameter to at least one of the known model parameters.

* * * * *